US009106087B2

(12) United States Patent
West

(10) Patent No.: US 9,106,087 B2
(45) Date of Patent: *Aug. 11, 2015

(54) DEVICE AND METHOD FOR ELIMINATING TRANSFORMER EXCITATION LOSSES

(75) Inventor: Rick West, San Simeon, CA (US)

(73) Assignee: SCHNEIDER ELECTRIC SOLAR INVERTERS USA, INC., Livermore, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/250,367

(22) Filed: Sep. 30, 2011

(65) Prior Publication Data
US 2012/0019963 A1 Jan. 26, 2012

Related U.S. Application Data

(62) Division of application No. 12/686,336, filed on Jan. 12, 2010, now Pat. No. 8,058,958, which is a division of application No. 10/250,145, filed on Jun. 6, 2003, now Pat. No. 7,646,275.

(51) Int. Cl.
H01F 27/34 (2006.01)
H02J 9/00 (2006.01)
H01F 27/42 (2006.01)

(52) U.S. Cl.
CPC ............... *H02J 9/005* (2013.01); *H01F 27/341* (2013.01); *H01F 27/42* (2013.01); *H02J 2009/007* (2013.01)

(58) Field of Classification Search
CPC .... H02J 9/005; H02J 2009/007; H01F 27/341
USPC ............ 307/17, 125–131; 340/654, 656
See application file for complete search history.

(56) References Cited

U.S. PATENT DOCUMENTS

| 3,614,461 | A | | 10/1971 | Speer et al. ............... 307/64 |
| 3,967,180 | A | | 6/1976 | Weber et al. ............. 320/128 |
| 4,190,800 | A | | 2/1980 | Kelly, Jr. et al. ......... 340/12.33 |
| 4,281,515 | A | | 8/1981 | Ferriera ................. 62/235.1 |
| 4,549,679 | A | * | 10/1985 | Watson ..................... 225/2 |
| 4,565,929 | A | | 1/1986 | Baskin et al. ............ 290/44 |

(Continued)

FOREIGN PATENT DOCUMENTS

JP 55037681 A * 3/1980

OTHER PUBLICATIONS

"Economic Loading of a Transformer System", Levine and Smith, May 1949, AIEE Transformer Committee, pp. 733-739.*

*Primary Examiner* — Fritz M Fleming

(74) *Attorney, Agent, or Firm* — Lando & Anastasi LLP

(57) ABSTRACT

The invention is a device and method for eliminating core excitation losses in a distribution transformer when the transformer is not supplying power to loads. The invention consists of sensors, a control circuit, a user interface and a power contactor. The power contactor is connected on the line side of a transformer and is opened or closed automatically based on preprogrammed time or load criteria determined by the control circuit. In one operational mode and when the transformer is disconnected from the line, the control board generates low power pulses at the transformer load connection points in order to "search" for loads. If a load is detected, the transformer is reconnected by way of contactor closure. If the transformer load drops to zero, for a predetermined amount of time, the transformer is again disconnected and the pulsed load search is reestablished.

11 Claims, 2 Drawing Sheets

(56) References Cited

U.S. PATENT DOCUMENTS

| | | | |
|---|---|---|---|
| 4,626,763 A | 12/1986 | Edwards | 318/811 |
| 4,685,022 A | 8/1987 | Nichols, III et al. | 361/44 |
| 5,324,990 A * | 6/1994 | Cunningham | 307/125 |
| 5,519,306 A | 5/1996 | Itoh et al. | 323/222 |
| 5,539,601 A | 7/1996 | Farag | 361/23 |
| 5,760,491 A * | 6/1998 | Kalin | 307/17 |
| 6,175,510 B1 | 1/2001 | Loh | 363/37 |
| 6,195,271 B1 * | 2/2001 | Suzuki et al. | 363/20 |
| 6,434,024 B2 | 8/2002 | Shirato | 363/21.07 |
| 7,511,979 B2 | 3/2009 | Newman, Jr. | 363/149 |
| 7,646,275 B2 * | 1/2010 | West | 336/5 |
| 7,688,558 B2 | 3/2010 | Bax et al. | 361/42 |
| 8,058,958 B2 * | 11/2011 | West | 336/5 |
| 2007/0047270 A1 * | 3/2007 | Makino et al. | 363/34 |

* cited by examiner

DEVICE AND METHOD FOR ELIMINATING TRANSFORMER EXCITATION LOSSES

CROSS REFERENCE TO RELATED APPLICATIONS

The present application is a divisional of U.S. application Ser. No. 12/686,336, filed Jan. 12, 2010 which is a divisional of U.S. application Ser. No. 10/250,145, filed Jun. 6, 2003, (now U.S. Pat. No. 7,646,275), all of which are incorporated by reference in their entirety.

BACKGROUND OF INVENTION

The field of this invention is electric power distribution and control. Excitation losses are a function of the voltage applied to the primary windings of a transformer and are not load dependant. These no-load losses typically account for 50% of the total transformer losses at rated conditions. The magnitude of the excitation loss is proportional to the size of the transformer and is typically 1% to 2% of the power rating in larger transformers. The Environmental Protection Agency has determined that 61 billion kWH of electricity is wasted each year in transformer losses. The invention is intended to disconnect a distribution transformer from the AC power source during no-load conditions. The invention is targeted for use in industrial and renewable energy applications.

DETAILED DESCRIPTION

Figure 1:
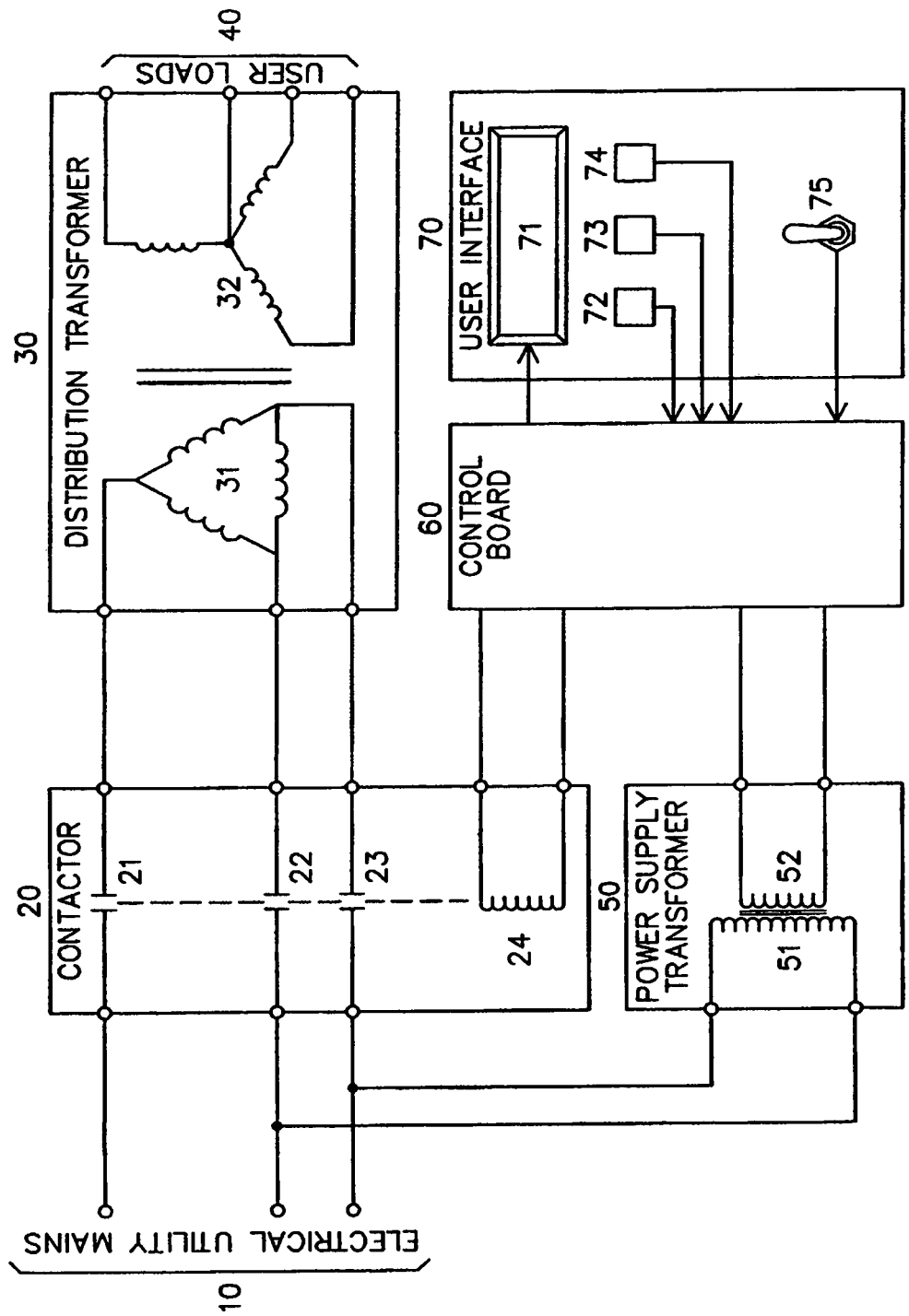
FIG. 1 Preferred embodiment of the invention operating with preprogrammed on and off times where load are not sensed or detected.
Figure 2:
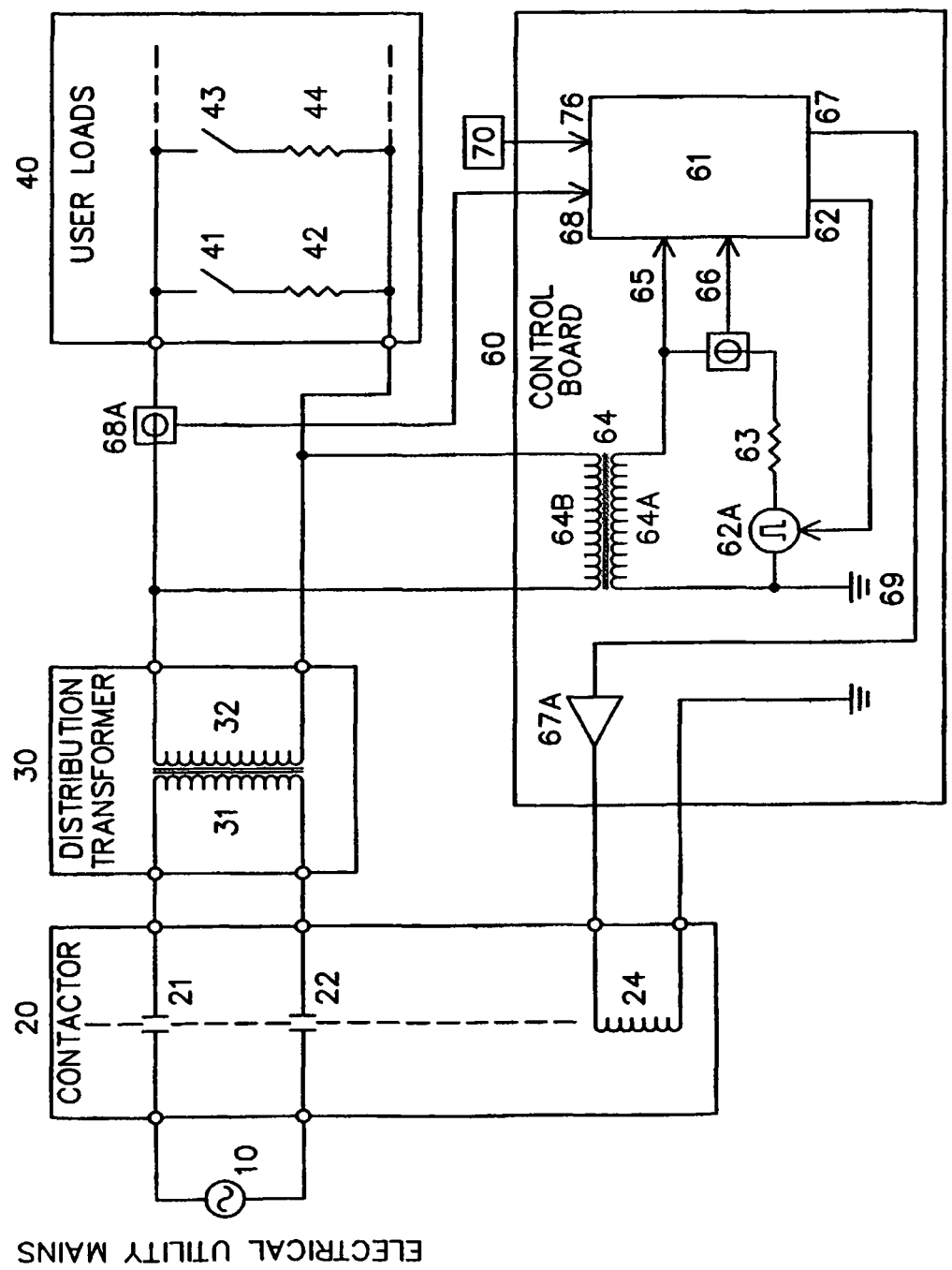
FIG. 2 Preferred embodiment of the invention operating with load current monitoring when the transformer is connected to the utility line and operating with a smart load search algorithm when the transformer is disconnected from the utility line.

FIG. 1 illustrates a simplified preferred embodiment of the invention as used with external three-phase distribution transformer 30, powered by electric utility mains 10 and delivering power to user loads 40. The invention substantially consists of contactor 20, power supply transformer 50, control board 60 and user interface 70. The contactor consists of electrical contacts 21, 22 and 23 that are closed or opened as the contactor control coil 24 is energized or de-energized respectively. Contactor 20 is positioned to make or break the electric utility power connection to the primary side of transformer 30 as commanded by control board 60. User interface 70 allows the user to program the operational mode as well as connect, disconnect and reconnect criteria of through programming switches 72, 73 and 74 and display panel 71. Switch 75 is a bypass switch that overrides control board 60 commands and forces the connection of the transformer to electric utility mains 10. There are number of intended operational modes for the invention. In the user selected timed sleep mode, the user enters the expected times of transformer use at the user interface by time of day and day of week and thereby programs a controller microchip on the control board. A typical industrial application would be to disconnect all distribution transformers used for machinery, process control and factory lighting after the last work shift of the day and on weekends. In the user selected photovoltaic mode, the user enters time, date, longitude and latitude at the user interface. The program within a control board controller microchip calculates the times of sunset and sunrise and commands the contactor to be open during these time periods. In the user selected wind turbine mode, an external sensor, typically an anemometer or turbine tachometer, measures wind speed. The program within a control board controller microchip commands the contactor to be open during times or low wind speed. The delay to disconnect and delay to reconnect parameters are selectable at the user interface. FIG. 2 illustrates the preferred embodiment of the invention with the added capability of operating in a smart load detection mode as shown with external single-phase distribution transformer 30, powered by electric utility mains 10 and delivering power to user loads 40. In system applications with three-phase transformers, three of the circuits described herein would be used. For the purpose of illustrating the smart load detection function, all of the invention is not shown in FIG. 2. As illustrated in FIG. 2 and when the invention is operating in the user selected, smart load detection mode and when contactor 20 is closed and distribution transformer 30 is energized and supporting user loads 40, the controller microchip 61 monitors current sensor 68A through analog to digital converter input 68 on controller microchip 61. This data is compared to a zero current, null value stored in nonvolatile memory and is used to determine a no-load condition on transformer secondary 32. If a no-load condition is detected continuously for the user-programmed period of time, contactor 20 is opened. In FIG. 2, loads 42 and 44 with switches 41 and 43 represent a plurality of typical loads. To detect the reconnection of any load when transformer 30 is not energized, the controller microchip 61 sends a command 62 to pulse generator 62A. The resulting pulse is applied across divider impedance 63 and the primary 64A of isolation transformer 64. The impedance of the any loads connected to transformer secondary 32, will be reflected by through isolation transformer secondary 64B to primary 64A. The voltage sensed across isolation transformer primary 64A and the current sensed through the same winding are connected to analog to digital inputs on controller microchip 61. Controller microchip 61 in the preferred embodiment is a digital signal processor (DSP) device. Controller 61 analyses the response to the pulse compared to a baseline no-load response. If controller 61 determines from this real-time to prerecorded data comparison that a load is connected or has been reconnected to transformer secondary 32, then command 67 is given to coil driver 67A to close contactor 20 thereby energizing transformer 30 to support user loads 40. Load detection and reconnection can be accomplished in a less than 1 second. The load seeking pulse rate can be many times per second with the only criteria being that the total pulse energy be orders of magnitude less than excitation losses that the invention is saving. The recording of baseline, no-load conditions is initiated through user interface 70 via command 76 to controller 61 to generate calibration pulses and store the results as part of the system setup routine. 69 is the reference designator for the control circuit ground. A device configured from the component parts described, the function of the circuits described and the methods of application that may in part or as a whole contribute to the saving of transformer core excitation losses are novel, new and the basis of this invention.

The invention claimed is:

1. A method for reducing transformer losses in a distribution transformer having an input winding to couple to a power source and an output winding to couple to one or more loads, the method comprising:

providing AC power at the one or more loads at an output coupled to the output winding;

determining whether a decoupling condition is satisfied by measuring a characteristic of the AC power to the one or more loads using an AC sensor coupled between the one or more loads and to the output winding;

decoupling the distribution transformer from the power source when the decoupling condition is satisfied, wherein said decoupling condition is an indication that no load is connected to the distribution transformer based on measurement, the method further comprising determining whether a load is coupled to the distribution transformer; and determining that a coupling condition is satisfied by detecting a signal at a position between the output winding and the output.

2. The method of claim 1 wherein said indication is derived by:

measuring, via the sensor, current flow between the distribution transformer and a load point at which a load is connectable to the distribution transformer;

comparing a result of the measurement against a reference level; and issuing said indication depending on the outcome of said comparison.

3. The method of claim 1, wherein said decoupling condition is manually-generated, or is an automatically-generated output.

4. The method of claim 3, wherein said automatically generated output is a timer output or is an output of a program.

5. The method of claim 1, wherein determining whether a a coupling condition is satisfied comprises:

directing a pulse in the direction of the output;

measuring a reflection of the pulse; and comparing a value of said measurement with a reference value.

6. A device for reducing transformer losses in a distribution transformer having an input winding to couple to a power source and an output winding to couple to one or more loads, the device comprising:

an output configured to provide output AC power at a load;

means, coupled to the output, for determining whether a decoupling condition is satisfied by measuring a characteristic of AC power to the one or more loads using an AC sensor coupled between the one or more loads and the output winding;

means for decoupling the distribution transformer from the power source when the decoupling condition is satisfied, wherein said means for determining provides an indication that no load is connected to the distribution transformer; and means for determining that a coupling condition is satisfied by detecting a signal at a position between the output winding and the output.

7. The device of claim 6 wherein the device further comprises means for:

measuring, via the sensor current flow between the distribution transformer and a load point at which a load is connectable to the distribution transformer;

comparing a result of the measurement against a reference level; and issuing said indication depending on the outcome of said comparison.

8. The device of claim 6, wherein said means for determining whether a coupling condition is satisfied comprises:

means for directing a pulse in the direction of the one or more loads;

means for measuring a reflection of the pulse; and comparing a value of said measurement with a reference value.

9. A device that automatically disconnects from a power source a distribution transformer having an input winding configured to couple to the power source and an output winding configured to couple to one or more loads during no load or light load conditions to prevent transformer losses in said distribution transformer, the device having a sensor configured to couple to the output winding and wherein the device is configured to apply a pulse to secondary circuits using an isolation transformer coupled in parallel with the one or more loads and where a voltage and a current response of said secondary circuits to said pulse is compared to a previously recorded, baseline, no-load response to determine presence or absence of a load on the output winding.

10. A device according to claim 9, where one or more connect and disconnect times of said distribution transformer are programmed by way of a user interface.

11. A device according to claim 9 where in a disconnected state, when the input winding is removed from the power source, said device is configured to use low power pulse techniques to measure a characteristic impedance of one or more transformer secondary circuits in order to detect the one or more loads, and thereby establish reconnect criteria.

* * * * *